3,721,523
Patented Mar. 20, 1973

3,721,523
MODIFICATION OF REACTIVE HYDROGEN CONTAINING POLYMERS WITH AMINO EPOXY PHOSPHONATES

Giuliana C. Tesoro, Dobbs Ferry, N.Y., assignor to J. P. Stevens & Co., Inc., New York, N.Y.
No Drawing. Original application June 24, 1966, Ser. No. 560,101, now Patent No. 3,528,998. Divided and this application May 22, 1970, Ser. No. 38,636
Int. Cl. D06m *13/10, 13/32, 13/44*
U.S. Cl. 8—196                    13 Claims

ABSTRACT OF THE DISCLOSURE

Amino epoxy phosphonates, such as 1-amino-2,3-epoxypropylphosphonates and N-substituted derivatives thereof, including polyphosphonates and silyl phosphonates, can be homopolymerized, or reacted with active-hydrogen-containing polymers, such as cellulose, and the silyl derivatives can be reacted with glass. These compounds thus have utility as flame-retardant and cross-linking agents for cellulose, as finishes for glass surfaces, and as coupling agents for glass fiber-thermosetting plastic laminates.

---

This application is a division of application, Ser. No. 560,101, filed June 24, 1966, now U.S. Patent No. 3,528,998.

This invention relates to new organic compounds of phosphorus, characterized by the presence of both epoxy and amino groups in the same molecule, to materials modified by such compounds, and to the use of such compounds for finishing glass and for improving the bonding of resins to glass. Specifically, this invention relates to (1) the monomers, polymers and copolymers of amino epoxy phosphonates, with or without silicon, (2) to the interaction of such compositions, either singly or in combination, with polymers containing active hydrogen atoms to achieve durable flame-retarding properties with or without permanent set, and (3) to the use of said compositions as finishes for fibrous glass and as coupling agents for laminates made of thermosetting resins and glass fiber.

The reactivity of amino and epoxy groups is such that one would ordinarily expect them to react readily when brought together. It is for this reason that stable compounds containing these two advantageous groups, as well as other functional groups, has not been previously known. However, it has been surprisingly discovered that reasonably stable compounds can be prepared which contain amino, epoxy and phosphonate groups in the same molecule.

Because these novel amino epoxy phosphonates exhibit unexpected stability, it has been found that they may be usefully employed in new areas where the advantageous reactivity of the amino functionality was not heretofore available. Of particular interest here is the polymerization of the amino epoxy phosphonate compounds, and of the ready modification of cellulose and other active-hydrogen containing macromolecules by amino epoxy phosphonates to give them flame resistance and/or permanent set characteristics. A remarkable advantage has also been found by utilizing the compounds of the invention to improve the bonding of epoxy and polyester resins to glass. This is particularly true of amino epoxy silane compounds having one or more silicon atoms, although their presence is not necessary.

Therefore, it is an object of the present invention to provide a new chemical class of compounds and mono- and copolymers of them, namely neutral esters of phosphonic acids having both epoxy and amino groups in the same molecule.

It is an object of the present invention to provide a new chemical class of relatively stable polymerizable compounds having epoxy, amino and phosphonate groups in the molecule and being suitable, in their monomeric or polymeric states of crosslinking or otherwise reacting with material containing reactive hydrogen to impart valuable properties to them.

It is a further object of the present invention to provide modified cellulosic materials by treating them with an amino epoxy phosphonate compound so as to render them flame-retardant, with or without imparting properties offering essentially permanent configuration or set, as desired, such as permanent pleats, flat drying, and crease recovery.

It is another object of the present invention to provide new and useful organic compositions of phosphorus and nitrogen, with or without silicon as needed, through homopolymerization as well as through copolymerization with other monomers.

It is another object of the present invention to provide means of bringing about improvement in textile materials which are lasting, durable against wear, and resistant to removal by washing and to attack by solvents.

It is another object of the present invention to provide improved means of finishing fiberglass, and to make possible a finish for fibrous glass that will provide effective bonding to resinous compositions of many diverse chemical types.

It is yet another object of the present invention to provide fiberglass-resin laminates having superior properties of physical strength.

The amino epoxy phosphonates of this invention are represented by the following generic Formula I:

$$\underset{(I)}{\overset{O}{\underset{|}{CH_2—CH—CH—NH—Q}}\atop{OP(OR)_2}}$$

wherein R is selected from the group consisting of alkyl, substituted alkyl, cycloalkyl, alkenyl, aryl and substituted aryl, and Q is selected from the group consisting of hydrogen, alkyl, substituted alkyl, alkoxyalkyl, cycloalkyl, alkenyl, aryl, substituted aryl, a grouping $$-(Y)_m-NH-CH-CH=CH-R'$$
$$\qquad\qquad\quad |$$
$$\qquad\qquad\;\;OP(OR)_2$$

a grouping $$-(Y)_m-NH-\underset{|}{CH}-\overset{O}{\overset{\diagup\;\diagdown}{CH—CH}}-R'$$
$$\qquad\qquad\;\;OP(OR)_2$$

wherein, in both of said groupings, $m$ has the value of zero to 1;
Y is a divalent organic radical which is selected from the group consisting of aliphatic, alicyclic, aromatic and heteroaliphatic; and
R' is selected from the group consisting of hydrogen, alkyl, and aryl; and a grouping $$—R'''Si(R'')_3$$

wherein

R'' is selected from the group consisting of alkoxy, alkyl, alkoxyalkyl, alkenyl, and aryl; and
R''' is a divalent organic radical having terminal carbon atoms.

As indicated, compounds of the invention are phosphonates. Phosphonates are esters or salts of phosphonic acids, which are organic acids having 2 acidic hydrogen atoms per phosphorus atom wherein the organic moiety is bonded directly to the phosphorus atom, and in the acid form, one of the oxygen atoms is not linked to hydrogen. Phosphonates of the present invention are all based structurally on 1-amino-2,3-epoxypropylphosphonic diesters,

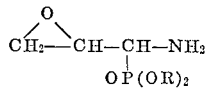

wherein R is defined in connection with the generic Formula I, which formula also defines the substituents which are possible at the amino group for the 1-amino-2,3-epoxypropylphosphonates of this invention. The degree of the amino function may be either primary (—NH$_2$) or secondary (as alkylamino-, alkoxyalkylamino-, alkenylamino-, benzylamino-, and anilino-).

MODE OF CARRYING OUT THE MANUFACTURE OF AMINO EPOXY PHOSPHONATES

Amino epoxy phosphonates (I) are conveniently made by an addition reaction involving two reactants, namely, a 2,3-epoxypropylidenimine (II), and a diester of phosphorus acid (III), as indicated in Reaction A:

Reaction A

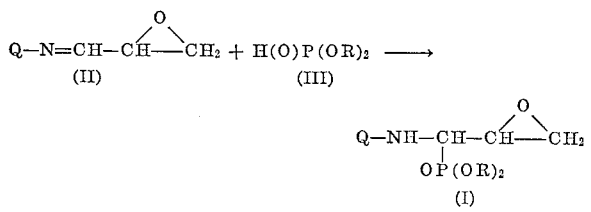

The symbols Q and R have the meanings previously given as part of general Formula I.

In carrying out the actual process of addition, it is advisable to use a freshly prepared 2,3-epoxypropylidenimine (II), inasmuch as yields of adduct (I) are apt to be unsatisfactory if the aldimine has been allowed to stand. It is also usually helpful, although not essential, to use a solvent or diluent. If a diluent is used, it should be one which is non-reactive with respect to the starting materials (II and III) and product (I). Also, for ease of removal of the diluent by distillation, the diluent should be fairly volatile. Hydrocarbon solvents such as benzene, toluene or xylene are suitable diluents. As to temperature, the reaction usually occurs well around room temperature or lower; that is, in the range of 5 to 30° C., but somewhat higher or lower temperatures may be used, as between 30 and 50° C., depending on the solvent, the extent of dilution, and manner of addition. Longer periods are necessary for reaction at lower temperatures.

One reason for operating at moderate rather than warmer temperatures is to minimize side reactions on the part of the imine, such as addition reactions involving two or more imine molecules. Unwanted reactions involving two or more imine molecules are also suppressed by keeping the imine diluted. Another reason for using moderate temperatures when carrying out the reactions in which amino epoxy phosphonates are formed is to prevent subsequent reactions on the part of the amino epoxy phosphonates initially formed. Although there is remarkable stability to the amino epoxy phosphonates there is an upper temperature limit to the stability of each of them and the reaction temperature should not be excessive when an amino epoxy phosphonate is being made. Another side reaction that can be eliminated by avoiding an excessive temperature is the reverse reaction in which an amino epoxy phosphonate decomposes into imine and phosphite diester.

In order to carry out the desired preparation, substantially equimolar quantities of a 2,3-epoxypropylidenimine (II) and diester (III) of phosphorus acid [1] are used.

One manner of effecting reaction is to add the phosphite (III), either undiluted or in up to 10 times its weight of a non-reactive solvent, slowly to a stirred solution of the freshly prepared imine (II) in 1 to 10 times its weight of the solvent. The length of time required for the addition of phosphite will depend in part on the scale of the operation. The reaction is mildly exothermic and it is advisable to regulate the rate of addition so as to keep the reaction temperature below about 40° C. in order to prevent undesirable reactions on the part of the imine. After all of the phosphite has been added, stirring is continued for a period, such as a few hours. The reaction mixture may be allowed to stand for several hours or longer before being processed by distilling off the solvent. Distillation and recovery of solvent can be carried out advantageously at reduced pressure, but removal of solvent also may be accomplished at atmospheric pressure if a low-boiling solvent has been used.

The product remaining after solvent has been distilled from it is a diester (I) of 1-amino-2,3-epoxypropylphosphonic acid, or an N-substituted derivative. Its purity can be determined by any of several means, such as by epoxide analysis and by absorption bands in the infrared part of the spectrum. For instance, strong bands typical of the phosphonate structure occur at 8.2–9.3 and 9.6–10.4 microns. On the other hand, little or no imine band will occur at 6 microns, verifying that addition of phosphite diester occurred substantially quantitatively at the carbon-to-nitrogen double bond of the 2,3-epoxypropylidenimine (II).

An alternative manner of effecting reaction is by gradual addition of the freshly prepared 2,3-epoxypropylidenimine (II), either diluted or undiluted, to the phosphite diester (III), which is kept stirred. In this manner of addition the imine may be kept unheated, or even cold, before it comes in contact with the phosphite diester. When the imine is added to the phosphite diester, a warmer temperature (e.g. 40 to 50° C.) may be used to advantage because no appreciable concentration of imine is exposed to warm temperature for any considerable length of time.

Procedures other than those just described can also result in the formation of amino epoxy phosphonates. For example, 3 starting materials, namely 2,3-epoxypropionaldehyde (IV), primary amine (V), and phosphite diester (III), when allowed to react together, produce the corresponding amino epoxy phosphonate, according to the following Reaction B:

Reaction B

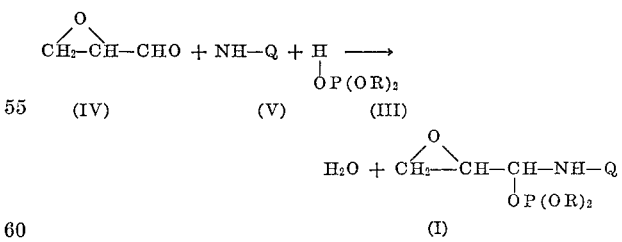

It is not essential to provide for the removal of water because the phosphonate ester is very resistant to hydrolysis, but in general the over-all process is more satisfactory when a dehydrating agent is used; for example, anhydrous magnesium sulfate, anhydrous sodium sulfate, and anhydrous potassium carbonate. Depending upon the

---

[1] Diesters of phosphorus acid undergo certain reactions, such as addition across a carbon-to-nitrogen double bond, as if they possessed the phosphonate type of structure, illustrated here with the dimethyl ester.

It is customary to call the compound dimethyl hydrogen phosphite or simply dimethyl phosphite instead of using the name "dimethyl phosphonate."

nature of Q and R groups, Reaction B usually takes place at around 20 to 40° C. Provision should be made for cooling the mixture, especially if a sizable quantity is involved.

The aldimines which are used, along with phosphite diesters, in making the amino epoxy phosphonates of this invention are derived from a primary amine, Q—NH$_2$ (V) (which is ammonia if Q is H) and 2,3-epoxypropionaldehyde (IV), for which the trivial name is glycidaldehyde. Hence the combining form "glycid" may appear in place of "2,3-epoxyprop . . . ."

Thus, for example, when Q is ethyl, the imine (II) is the condensation product N - ethyl-2,3-epoxypropylidenimine (or N-ethylglycidylidenimine) identified as compound (VI) in the following Reaction C:

Reaction C

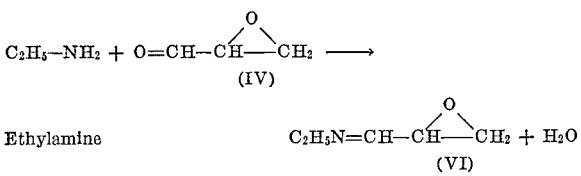

In order to help the reaction to go to completion, it is desirable to remove water as it is formed, as by adding a dehydrating agent, e.g. anhydrous magnesium sulfate. Other suitable dehydrating agents that can be added to absorb by-product water resulting from Reaction C are anhydrous sodium sulfate and anhydrous calcium sulfate. Removal of water is desirable to help stabilize the N-substituted 2,3-epoxypropylidenimine as well as to assist in its formation. The drier the N-substituted 2,3-epoxypropylidenimine, the less prone it is to polymerize. It is advisable to distill imines at low absolute pressure in order to help preserve or purify them.

When the amine is a diamine it is possible to produce bis-epoxy compounds by reacting the diamine with two moles of glycidaldehyde as depicted below in Reaction D:

Reaction D

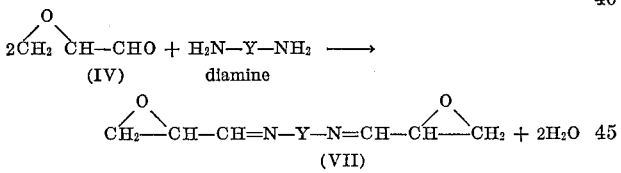

The bis-epoxy imine compound (VII) can in turn be reacted with phosphite diester (III) in the same manner as described hereinabove in general Reaction A to obtain the corresponding difunctional epoxy amino phosphonate:

Reaction E

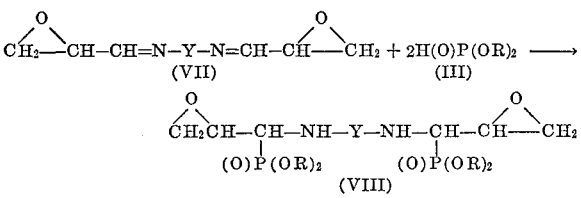

It will be noted that the reaction product (VIII) is one in which Q of general Formula I is selected to be

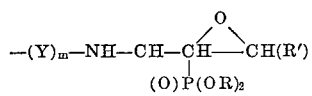

wherein R' is hydrogen and m is one.

Due to the bi-functional character of epoxy amino compounds of the kind represented by Formula VIII, it is readily appreciated that such a compound is capable of cross-linking polymers through each of its epoxy groups, as will be discussed more fully hereinafter.

Examples of a few of the many amines (V) which may be condensed with 2,3-epoxypropionaldehyde (IV) to produce imines (II) suitable for practicing this invention are as follows:

| Q—NH$_2$ | Q—N=CH—CH—CH$_2$ (epoxide) |
|---|---|
| Amine (V) | Imine (II) |
| Ammonia | 2,3-epoxypropylidenimine |
| Methylamine | N-methyl-2,3-epoxypropylidenimine |
| Ethylamine | N-ethyl-2,3-epoxypropylidenimine |
| Isopropylamine | N-isopropyl-2,3-epoxypropylidenimine |
| Tert-butylamine | N-tert-butyl-epoxypropylidenimine |
| Octadecylamine | N-octadecyl-2,3-epoxypropylidenimine |
| 2-ethoxyethylamine | N-(2-ethoxyethyl)-2,3-epoxypropylidenimine |
| Allylamine | N-allyl-2,3-epoxypropylidenimine |
| Benzylamine | N-benzyl-2,3-epoxypropylidenimine |
| Aniline | N-phenyl-2,3-epoxypropylidenimine |
| 3-(triethoxysilyl)-propylamine | N-[3-(triethoxysilyl)propyl]-2,3-epoxypropylidenimine |
| Ethylenediamine | N,N'-ethylenebis-(2,3-epoxypropylidenimine) |
| 1,6-hexanediamine | N,N'-hexamethylenebis-(2,3-epoxypropylidenimine) |
| p-Phenylenediamine | N,N'-p-phenylenebis-(2,3-epoxypropylidenimine) |
| 5-(triallylsilyl)-amylamine | N-[5-(triallylsilyl)amyl]-2,3-epoxypropylidenimine |
| 4-(trimethoxysilyl)-butylamine | N-[4-(trimethoxysilyl)butyl]-2,3-epoxypropylidenimine |
| (Triphenylsilyl)methylamine | N-[(triphenylsilyl)methyl]-2,3-epoxypropylidenimine |

Illustrative of the various diesters (III) of phosphorus acid which may be used as starting materials to make amino epoxy phosphonates (I) of this invention are the following, which sometimes are named with the word 'hydrogen" included before "phosphite."

$$H(O)P(OR)_2$$

| Phosphite diester (III) | R in Formulas I and III |
|---|---|
| Dimethyl phosphite | CH$_3$— |
| Ethyl methyl phosphite | CH$_3$CH$_2$— and CH$_3$— |
| Diethyl phosphite | CH$_3$CH$_2$— |
| Bis-(2-ethoxyethyl) phosphite | CH$_3$CH$_2$—O—CH$_2$—CH$_2$— |
| Diallyl phosphite | CH$_2$=CH—CH$_2$— |
| Bis-(2-methylallyl) phosphite | CH$_2$=C(CH$_3$)—CH$_2$— |
| Dicyclohexyl phosphite | (cyclohexyl)— |
| Dibenzyl phosphite | C$_6$H$_5$—CH$_2$— |
| Diphenyl phosphite | C$_6$H$_5$— |
| Diisopropyl phosphite | (CH$_3$)$_2$CH— |
| Dioctyl phosphite | C$_8$H$_{17}$— |
| Bisdodecyl phosphite | C$_{12}$H$_{25}$— |
| Bisoctadecyl phosphite | C$_{18}$H$_{37}$— |

The above lists of imine and phosphite compounds is by no means exhaustive of those that are suitable for the purposes of the invention and others would be readily suggested to those skilled in the art. The relatively large number of possible combinations of phosphite and imines is brought about by the lack of criticality associated with the specific nature of the substituents R, R', R" and R''' in the general Formula I, the important factor being the presence in stable form of the functional groups: epoxy, amine and phosphonate.

The compounds of the present invention are particularly useful for the modification of macromolecules having active hydrogen. A prime example of this is the modification of cellulosic material by the amino epoxy phosphonates to impart flame retardant properties to the material.

Diallyl 1-(2-ethoxyethylamino)-2,3 - epoxypropylphosphonate, which is the product of diallyl phosphite and N-(2-ethoxyethyl)-2,3-epoxypropylidenimine, is used below to illustrate the type of reactions that can be brought about on a polymer of the active-H type, cellulose being used for the purpose of exemplification:

Reaction F

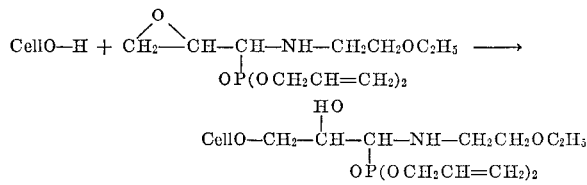

A variation of this modification of cellulose occurs in those instances when the amino epoxy phosphonate has two functional epoxy groups, as illustrated, for example, in Formula VIII. In such a case, the compound can be used to cross-link the active-hydrogen containing material through both epoxy groups. This aspect of the invention not only permits the fabric to obtain increased flame retardance, but to have the increased permanent set properties associated with wash and wear fabrics, e.g. increased dimensional stability, minimized progressive shrinkage, provision for permanent pleats and durable creases, and improved recovery from unwanted creases.

The cross-linking functionality is also obtained when the amino epoxy phosphonates are alkenyl esters, especially where R in Formula I is a readily polymerizable unsaturated group of the vinyl or allyl type. In such an instance the epoxy is reacted with the active-H containing material in the manner indicated by Reaction F (and discussed more fully hereinafter) and the vinyl or allyl functionality is separately reacted under well-known polymerizing conditions to complete the cross-link. Suitable catalysts for such a reaction are diisopropyl peroxydicarbonate, benzoyl peroxide, lauroyl peroxide, isopropyl hydroperoxide, azodibutyronitrile, and azobis (2-methylpropionitrile).

The epoxy amino phosphonates of the invention can be reacted with the active-H containing material either as monomers, as illustrated, for example, by Reaction F, or as homopolymers, co-polymers or graft polymers. It is sometimes advantageous to treat a cellulosic material with high molecular weight finishes or to impart to the material advantageous properties associated with monomers or polymers which are readily co-polymerized or grafted onto the compounds of the present invention.

The formation of homopolymers or co-polymers with other epoxide compounds can be achieved by interacting the monomeric materials through their epoxy groups in the presence of a suitable catalyst such as hydrogen chloride, methylsulfuric acid, benzenesulfonic acid, antimony pentachloride, zinc tetrafluoroborate, potassium hydroxide, and tetramethylammonium hydroxide.

When the epoxy amino phosphonate monomer contains two epoxy groups, then even after polymerization, there remain unreacted epoxy groups available for further reaction with the active-H containing material as more particularly described below.

On the other hand, the polymerizable group may be either (a) alkenylamino (Q—NH— where Q is alkenyl) or (b) alkenyloxy (RO— linked directly to the phosphorus, where R is alkenyl).

Reaction F describes the latter type of compound. In this instance, the addition is through the olefinic group, and the polymers, co-polymers and graft polymers formed can be further reacted with active-H containing materials through the epoxide function.

The preferred procedure for reacting an amino epoxy phosphonate with an active-H containing material is described as follows with special reference to the treatment of a cellulosic fabric. The procedure applies whether or not the amino epoxy phosphonate is a monomer or polymer, and whether or not it is capable of cross-linking the cellulosic material.

Interaction between an amino epoxy phosphonate and polymeric material such as cellulosic fabric first involves saturating the fabric (as by padding) with an amino epoxy phosphonate in an inert solvent such as 1,2-dimethoxyethane. Other lower ethers of the ethylene glycol series are also suitable as a rule, providing they are appropriately volatile for satisfactory removal by evaporation. The amount of amino epoxy phosphonate deposited on the fabric is controlled by the original concentration and the pickup during padding. Then the solvent is evaporated off, in which operation it is usually helpful to employ a temperature reasonably above room temperature, such as 60° C.

The reaction is best carried out under acid conditions, preferably with an acid catalyst or an acid-yielding salt. Suitable catalysts are zinc tetrafluoroborate ($Zn(BF_4)_2$); salts of polyvalent metals such as the chlorides, sulfates or nitrates of magnesium, zinc and aluminum; and inorganic acid salts of ammonia and amines. The catalysts may also be a non-volatile organic acid such as citric, tartaric, maleic and the like, used alone or in combination with the above-mentioned acid-forming salts.

Therefore, for example, in order to catalyze the reaction between epoxy and hydroxyl groups (of the amino epoxy phosphonate and cellulose, respectively), the fabric resulting from the initial padding and drying operation is overpadded with the catalyst, such as an aqueous solution of zinc tetrafluoroborate saturated with sodium chloride or other inert salt to minimize leaching. If zinc tetrafluoroborate is used the amount should be between about 0.01 and 0.1 of the amount of amino epoxy phosphonate. After the overpadded fabric has been dried, it is subjected to curing at approximately 150° C. for 1 to 20 minutes. Then the fabric is neutralized by rinsing it with a dilute solution of a mildly alkaline base, as potassium bicarbonate, washed in a mild detergent solution, and dried. The resulting fabric generally has a good hand; it will exhibit increased resistance to flame; and, in the case of a cross-linked cellulosic material, there will be imparted permanent set qualities. Although the modification of an active-H containing polymer is described above with especial reference to cellulosic fabrics, there are many other active-hydrogen containing materials which may similarly be modified of which the following are examples:

Polysaccharides and certain derivatives of them: cellulose, cotton, linen, wood, paper, regenerated cellulose (as cuprammonium rayon, viscose rayon, and cellulosic film), starch hydroxyethylcellulose, and aminoethylcellulose; proteins and certain of them: wool, silk and polypeptides; and synthetic polymers having hydroxyl or amino groups; polyvinyl alcohol, partially hydrolyzed polyvinyl acetate, hydrolyzed co-polymer of ethylene and vinyl acetate, and polyamine macromolecules.

The compounds of the invention also find substantial advantage in the finishing of glass fiber and as coupling agents for laminates made of glass fiber and thermosetting resins. When fiber glass is used to reinforce thermosetting resins, a finish of the right type makes possible an improvement in properties of physical strength. When applied for that purpose in fiber glass-resin laminates, the finish is a coupling agent or bonding agent. Also, the hand, or feel, of woven fiber glass is softened to a desired degree by a suitable finish.

Amino epoxy phosphonates function as superior finishes and coupling agents for laminates made of fiber glass and thermosetting resins and their use as such is considered part of the present invention. Several types of resins are applicable for making such laminates, namely, polyester resins (particularly the unsaturated alkyd-styrene type), epoxy resins, phenolic resins, and urea resins. Laminated sheets, rods and tubes are standard forms from which numerous commercial parts are obtained by sawing, punching, milling and machining.

Fiber glass-reinforced thermoset resins of superior quality are needed to produce fenders, vehicle bodies, ducts, boat hulls and various tortuous shapes having high strength and impact resistance. Molding pressures are relatively low as a rule, i.e. from no pressure (contact molding) to low-pressure molding under 100 pounds per square inch.

Amino epoxy phosphonates, including silyl amino epoxy phosphonates, are applicable as bonding or coupling agents in laminates requiring resistance to degradation by water, even under severe conditions. Examples of laminated articles which must last despite the action of water (including high humidity), which otherwise would be destructive, are boards for printed electric circuits, boats, naval structures for deep submergence, non-metallic pipe, and storage tanks.

Consequently, the present invention makes possible superior coupling agents which belong to a new chemical class, namely silyl amino epoxy phosphonates conforming to the formula

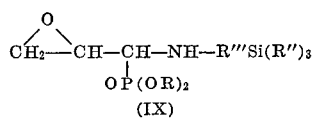
(IX)

where R is selected from the group consisting of alkyl, substituted alkyl, aralkyl, cycloalkyl, alkenyl, aryl, substituted aryl, and alkaryl; R" is selected from the group consisting of alkoxy, alkyl, alkoxyalkyl, alkenyl and aryl; and R''' is a divalent organic radical having terminal carbon atoms, it being understood that a methylene group is such a radical.

The following individual compounds are illustrations of this subgeneric class of 1-(omega-silylalkylamino)-2,3-epoxypropylphosphonates (IX):

Dimethyl: 1-[2-(trimethylsilyl)ethylamino]-2,3-epoxypropylphosphonate
Diethyl: 1-[3-(triethoxysilyl)propylamino]-2,3-epoxypropylphosphonate
Diallyl: 1-[4-(trimethoxysilyl)butylamino]-2,3-epoxypropylphosphonate
Diphenyl: 1-[5-(triallylsilyl)amylamino]-2,3-epoxypropylphosphonate
Dibenzyl: 1-[(triphenylsilyl)methylamino]-2,3-epoxypropylphosphonate It will be readily appreciated that each of the compounds of this type corresponds to the compound of Formula I wherein Q is selected as the grouping:

—R'''Si(R")$_3$

The make-up of the group R''' is not critical and comprises a relatively large class of radicals, including alkylene, arylene, alkyleneoxyalkyl, aryleneoxyarylene and the like.

The mechanism by which amino epoxy phosphonates impart superior strength to laminates in which fiber glass is the reinforcing material presumably is by improving the bond or binding force between fiber glass and thermoset resin.

Not only do amino epoxy phosphonates, including silyl amino epoxy phosphonates, make for stronger laminates, but they increase the long-term stability under rigorous conditions of exposure to water. Hence, these two coupling agents not only make possible stronger laminates, but they finish fiber glass so as to make its bonding with the thermoset resin much more resistant to hydrolytic attack.

Another advantage stemming from this invention is that a silyl amino epoxy phosphonate, properly formulated, is a superior universal finish for fiber glass used to reinforce thermosetting resins. The term "universal finish" means that the finish does not restrict the use of the fiber glass treated with it to just one type of thermosetting resin. For instance, it has been the practice to apply one kind of finish to fiber glass intended to reinforce an epoxy resin, and another kind of finish when the thermosetting resin is an unsaturated polyester. More specifically, a finish popular for fiber glass intended for use with epoxy-type resins is an epoxy-functional material such as a glycidoxy-propyl-trimethoxy silane, whereas another trimethoxy-silane, said to be a methacrylate-functional silane monomer, has been favored for use on fiber glass intended to reinforce unsaturated polyester. However, a universal finish, such as that now based on silyl amino epoxy phosphonates, offers the advantage of eliminating the necessity for finishing fiber glass in a different way for subsequent use with each variety of laminating resin.

Although the above description has been made with particular reference to silyl amino epoxy phosphonates (IX), it has been unexpectedly found that amino epoxy phosphonates form strong bonds with glass and resin even in the absence of an organo-functional silicon group.

That finding was unexpected because it had been previously believed that a coupling agent was bonded to the surface of fiber glass through silicon-oxygen bonds. For example, coupling agents traditionally have been of the trialkyloxysilyl type, and hydrolysis of the trialkoxysilyl group has been considered to be an essential step as part of the application of the coupling agent to glass. But now it has been found that an amino epoxy phosphonate which is devoid of silicon, e.g. diethyl 1-allylamino-2,3-epoxypropylphosphonate, is a superior coupling agent when compared with a time-honored standard coupling agent of the trimethoxysilane type. This is shown more particularly with reference to Example 12 set forth below.

In addition to the above effects, it has been found that when an organofunctional silicon group is present, as in the above listed five components, the bonding with unsaturated polyester is noticeably effective even in the absence of any carbon-carbon double bond on the silyl epoxy amino phosphonate. This unexpected activity is illustrated more particularly with reference to Examples 18 and 19 hereof.

Having thus described the purposes of the present invention, its various embodiments and their methods of preparation, I set forth the following examples to more specifically illustrate particular embodiments of the invention.

EXAMPLE 1

Preparation of diallyl 1-(2-ethoxyethylamino)-2,3-epoxypropylphosphonate

First, N-(2-ethoxyethyl)-2,3-epoxypropylidenimine was prepared as follows. A solution of 58.2 grams of glycidaldehyde in 1.5 liters of benzene containing 120.4 grams of anhydrous magnesium sulfate was cooled to 5–10° C., and a total of 63.3 grams of 2-ethoxyethylamine was added during 30 minutes. The cooling bath was removed and stirring was continued for 2.5 hours longer, after which time the drying agent was removed by filtration. Fresh anhydrous magnesium sulfate (25 grams) was added to the filtrate, and the solvent was distilled off under reduced pressure, after which the imine was collected at 62° C. (at a pressure of approximately 0.05 mm. of mercury) in 62% yield.

The condensation product, also called N-glycidylidene-2-ethoxyethylamine, was a yellow oil with a refractive index of 1.4480 (25° C., D line of sodium). The compound was 94% active by epoxide analysis as determined by the aqueous magnesium chloride hydrochlorination method described in Organic Analysis, Interscience Publishers, Inc., New York, N.Y. 1953, vol. 1, page 134. The infrared spectrum of this intermediate had a strong, sharp band at 6 microns, indicative of the imine group.

Next, the following addition reaction was carried out to obtain the adduct of N-glycidylidene-2-ethoxyethylamine and diallyl phosphite.

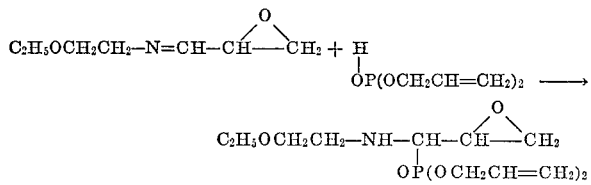

A solution of 19.2 grams of diallyl phosphite in 50 ml. of benzene was added during 30 minutes to a pre-cooled solution of 14.3 grams of N-(2-ethoxyethyl)-2,3-epoxypropylidenimine in 250 ml. of benzene at 10–15° C. After the reaction solution had been stirred for a total of 7 days at room temperature, the infrared spectrum of a small portion (stripped of benzene and redissolved in chloroform) indicated that all of the imine had been consumed. Vacuum stripping at 25–30° C. left 33 grams of the adduct, diallyl 1-(2-ethoxyethylamino)-2,3-epoxypropylphosphonate, which was 76% active by epoxide analysis (potentiometric titration with hydrogen bromide in acetic acid).

EXAMPLE 2

Preparation of diphenyl 1-(2-ethoxyethylamino)-2,3-epoxypropylphosphonate

The preparation may be depicted as follows:

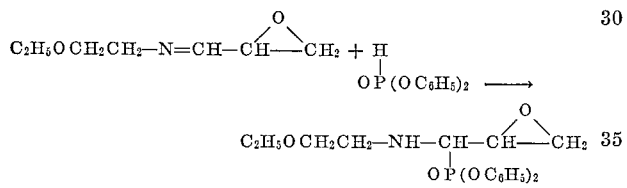

A solution containing 26.4 grams of diphenyl phosphite and 50 ml. of benzene was added dropwise during 30 minutes to a pre-cooled (10–15° C.) solution of 14.3 grams of N-(2-ethoxyethyl)-2,3-epoxypropylidenimine in 250 ml. of benzene. Then the mixture was stirred at room temperature for 3 days, after which period solvent was distilled off at 25–40° C. under reduced pressure. That left a quantitative weight of adduct, diphenyl 1-(2-ethoxyethylamino)-2,3 - epoxypropylphosphonate, 67% active by epoxide analysis (potentiometric titration with hydrogen bromide in acetic acid). The infrared spectrum of the product in chloroform was devoid of the imine absorption band at 6 microns.

EXAMPLE 3

Preparation of diethyl 1-(2-ethoxyethylamino)-2,3-epoxypropylphosphonate

The preparation may be depicted as follows:

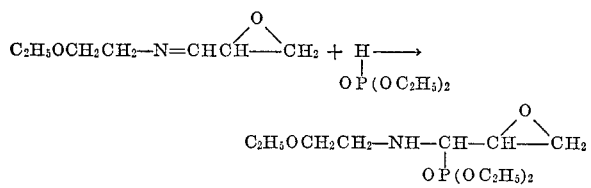

A solution of 15.8 grams of diethyl phosphite in 50 ml. of benzene was added to a stirred solution of 14.3 grams of N-(2-ethoxyethyl)-2,3-epoxypropylidenimine in 250 ml. of benzene which had been pre-cooled to 50° C. The progress of the reaction was followed by examining the infrared spectrum periodically. After 15 days at room temperature, the reaction had gone practically to completion, as evidenced by the disappearance of the band at 6 microns, characteristic of the imine structure. Solvent was distilled off at 25–30° C. under moderately reduced pressure initially, to an absolute pressure finally of 0.1 mm. Hg. The concentrated liquid product remaining from that treatment weighed 33.9 grams. The adduct had epoxide activity of 78% by aqueous magnesium chloride hydrochlorination.

EXAMPLE 4

Preparation of dimethyl 1-(ethylamino)-2,3-epoxypropylphosphonate

First, N-glycidylidene-ethylamine (mol. wt. 99) was prepared from glycidaldehyde (mol. wt. 72) and ethylamine in benzene by the procedure described in J. Am. Chem. Soc., vol. 74, pp. 1528–1531 (1952). The product, which also can be called N-ethyl-2,3-epoxypropylidenimine, boiled at 38–40° C. (22 mm. Hg) and had a refractive index at 20° C. of 1.4397.

Next, the following addition reaction was effected promptly:

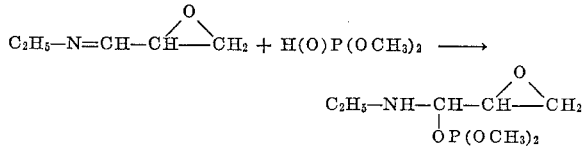

144 grams of dimethyl phosphite was added dropwise during 90 minutes to a stirred solution of 130 grams of the freshly prepared imine in 250 grams of benzene. The resulting orange colored solution was stirred for 4 hours at room temperature and allowed to stand overnight. The solvent was distilled off at reduced pressure, and a quantitative yield of the adduct remained.

The addition product, dimethyl 1-(ethylamino-2,3-epoxypropylphosphonate, had an infrared spectrum which showed strong absorption bands at 8.2 and 9.65 microns, characteristic of phosphonates and showed complete disappearance of the imine absorption band at 6 microns.

EXAMPLE 5

Preparation of diethyl 1-(allylamino)-2,3-epoxypropylphosphonate

First, N-glycidylidene-allylamine (also known as N-allyl-2,3-epoxypropylidenimine) was prepared from glycidaldehyde and allylamine in benzene containing a large excess of anhydrous magnesium sulfate to take up by-product water resulting from the condensation reaction. It was isolated from the reaction mixture by collecting the magnesium sulfate on a filter and by removing solvent by distillation in the presence of fresh anhydrous magnesium sulfate. The imine was collected by distillation at 30° C. (3 mm. Hg).

Its adduct with diethyl phosphate was made as follows:

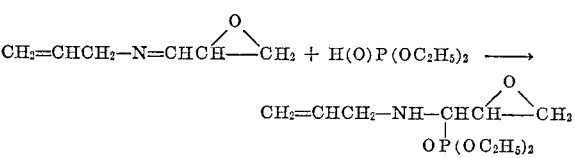

A solution of 133 grams of diethyl phosphite in 100 ml. of benzene was added dropwise with stirring to a solution of imine (102 grams) in 500 ml. of benzene. The solution turned from colorless to yellow and finally to deep orange during the addition. The addition product, diethyl 1-(allylamino)-2,3-epoxypropylphosphonate, was obtained by distilling off solvent to 41° C. (0.4 mm. Hg). That left 203 parts by weight (90.4% of the predicted yield) of adduct, 81% pure of epoxide analysis (aqueous magnesium chloride hydrochlorination method).

EXAMPLE 6

Preparation of diethyl 1-[3-(triethoxysilyl)propylamino]-2,3-epoxypropylphosphonate The imine from glycidaldehyde (mol. wt. 72) and 3-(triethoxysilyl)propylamine (mol. wt. 221) was prepared from equimolar quantities of those two reactants in benzene at 0 to 50° C., in the presence of anhydrous magnesium sulfate. After several hours had been allowed for condensation to proceed, distillation was used to recover and purify the imine, which distilled between 110 and 116° C. at a pressure of 0.15 mm. of mercury. The imine was N-[3-(triethoxysilyl)propyl]-2,3-epoxypropylidenimine, mol. wt. 275.

Then the folowing reaction was carried out:

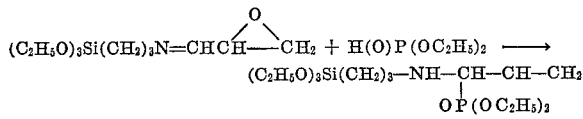

The purified imine (97 grams, 0.35 mole) was dissolved in 800 ml. of benzene and a solution of diethyl hydrogen phosphite (51 grams, 0.35 mole) in 200 ml. of benzene was added slowly over 3 hours at room temperature. The reaction temperature rose to 30° C. and a red-orange color developed during that period. Benzene was distilled off at reduced pressure. The addition product, diethyl triethoxysilylpropylamino - 2,3-epoxypropylphosphonate, was obtained in quantitative yield (90% purity, based on the determination of epoxide by aqueous magnesium chloride hydrochlorination). The infrared spectrum showed no imine band and strong bands at 9.3 and 10.4 microns, verifying the phosphonate structure.

EXAMPLE 7

Preparation of dimethyl 1-[3-(triethoxysilyl)propylamino]-2,3-epoxypropylphosphonate This adduct of N-glycidylidene-3-(triethoxysilyl)propylamine and dimethyl phosphite was prepared according to the following reaction:

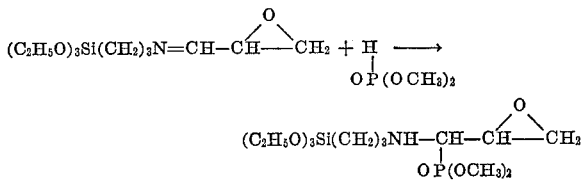

A solution of 82.5 grams of the imine, also called N-[3 - (triethoxysilyl)propyl] - 2,3 - epoxypropylidenimine, was stirred with 38.2 grams of dimethyl phosphite in 1,100 ml. of benzene at room temperature for 8 days. At the end of that period, the infrared spectrum of a small portion (freed of benzene) showed complete absence of the imine band at 6 microns. After solvent had been distilled from the main portion (at 25–30° C. under reduced pressure, until the weight of undistilled product was constant), a quantitative weight was obtained of the adduct, dimethyl 1 - [3 - (triethoxysilyl)propylamino] - 2,3 - epoxypropylphosphonate. It was 82% active by epoxide analysis (aqueous magnesium chloride hydrochlorination).

EXAMPLE 8

Modification of cellulosic material by an amino epoxy phosphonate

Samples of 100% cotton twill fabric having a weight of 8 ounces per square yard were treated with a 25% solution of dimethyl 1 - (ethylamino) - 2,3 - epoxypropylphosphonate (as prepared according to Example 4 hereof) in 1,2-dimethoxyethane. In the padding operation the rolls of the laboratory padder were adjusted so the amount of amino epoxy phosphonate actually deposited on the cotton was 19% based on the original weight of the fabric samples. The samples were dried at about 65° C. in a forced-draft oven, and then they were allowed to cool to room temperature.

The dried samples were overpadded with an aqueous solution of zinc tetrafluoroborate, $Zn(BF_4)_2$, saturated with sodium chloride.

Amounts of zinc tetrafluoroborate expressed as a percentage of the weight of the bath are shown in Table I. The samples so treated were dried at 70–80° C. and then cured in a forced-draft oven under conditions specified in the table.

After curing, the samples were neutralized in a dilute solution of potassium bicarbonate, washed in a non-ionic detergent solution at 60° C. and dried. The results are reported in Table I below:

TABLE I

| Sample | Percent $Zn(BF_4)_2$ on wt. of bath | Curing conditions | Percent wt. gain | Percent P Found by anal. | Percent P Calc'd from wt. gain |
|---|---|---|---|---|---|
| A1 | 0.8 | 5 min. at 150° C | 3.9 | | |
| A2 | 0.8 | 15 min. at 150° C | 4.6 | | |
| B1 | 1.6 | 5 min. at 150° C | 4.1 | | |
| B2 | 1.6 | 15 min. at 150° C | 5.4 | 0.79 | 0.76 |

Sample B2 burned less readily than an untreated control. By repeating the treatment and increasing the phosphorus content of the modified sample to 1.6% enhanced flame retardant properties were obtained.

EXAMPLE 9

Preparation of control laminates of glass cloth and epoxy resins using standard reference coupling agent Two epoxy resin laminates (differing only in the number of plies of fiber glass fabric) were made for purposes of comparison by using ingredients and conditions typical of existing commercial practice, based on a wet lay-up procedure. A fiber glass fabric of a grade commonly employed as a filter fabric, having a weight of 9 ounces per square yard and a thread count of 56 x 54 (warp x fill), was heat-cleaned under customary conditions (about 340° to 370° C. for 72 hours), then washed by a 0.1% solution of acetic acid in water, and finally rinsed by water.

A 1% solution of a control coupling agent for epoxy-type glass-reinforced laminates, 3-(2,3-epoxypropyloxy) propyltrimethoxysilane (hereinafter referred to as Z–6040), was applied to the fiber glass cloth by a padding operation. The cloth, saturated with the solution, was squeezed as it passed between 2 pad rolls. The finish was cured on the fabric by heating the cloth for 1 minute at approximately 120° C. The amount of coupling agent left on the glass fabric was approximately 0.5% of the weight of the fabric.

The epoxy resin used for making fiber glass-resin laminates for the purpose of rating coupling agents or finishes as to usefulness was Epon 828, a thermosetting liquid sold by Shell Chemical Company, Plastics and Resin Division, for making commercial laminates. Epon 828 is predominately 2,2 - bis[p-(2,3-epoxypropyl)-phenyl]propane (mol. wt. 340), but some closely related, higher molecular weight compounds also derived from glycidyl ethers of bisphenol A (p,p'-isopropylidenediphenol) are present, bringing the average molecular weight of Epon 828 to approximately 380. Epon 828 was specified to have one gram-equivalent of epoxide per 185–192 grams of resin, and to have a viscosity at 25° C. of 100–160 poises.

The hardener for the epoxy resin was m-phenylenediamine (referred to hereinafter as CL). In order to prepare the Epon 828/CL blend, which was in the ratio of 100:14.5 parts by weight, the following mixing procedure was used. To 14.5 parts of Epon 828 heated to 65° C. was added an equal weight of molten curing agent CL (also at 65° C.), and that hot mixture was blended thoroughly with 85.5 parts of additional Epon 828 at room temperature. The Epon 828/CL blend was prepared just prior to impregnating glass fabric with it.

To make the laminates from the fabric treated with the coupling agent, the fabric was cut into rectangles measuring 12.5 by 16 inches. Those were stacked 6 at a time, with warp yarns parallel, on a bag for the purpose of sealing in molten components during the pressing operation, soon to follow. The bag was made of Mylar, a registered trademark of E. I. du Pont de Nemours & Co. (Inc.) for polyester plastic based on polyethylene esters of terephthalic acid, often in the form of film or sheeting.

The lay-up was made on a plate heated to about 50° C. to reduce the viscosity of the resin and to facilitate saturation and impregnation of the fabric. A pool of the freshly catalyzed resin surrounded the stacked plies of glass fabric. Then the remaining plies were added to the stack and more catalyzed resin was applied so all stacked plies were saturated. One laminate was made with a total of 12 plies and a second laminate was made with 13 plies. Separate wet lay-ups and separate sealing bags were used to prepare each laminate. Just prior to sealing a bag holding a full stack of saturated plies, excess fluids (including entrapped air) were squeezed out by applying a rolling pin.

The bubble-free glass-resin system was sealed in the bag, which was then placed in a hot laminating press with 0.12 inch thick shims to hold thickness. The temperature of the press, initially at 93° C., was held at that temperature for 30 minutes, then kept at 120° C. for 35 minutes, and finally heated to 150° C. for 35 minutes to effect the cure. Immediately thereafter, cool water was circulated through tubes in the top and bottom platens to cool them and the laminate in order to prevent hot-warping.

Specimens of the laminates suitable for use on an Instron strength testing machine were made by sawing them into rectangles measuring 0.5 by 4 inches. They were tested for physical strength by the following methods:

Federal Test Method Standard, No. 406, Method 1031;
ASTM Test Method D790–59T (flexural strength);
ASTM Test Method D695–61T (compressive strength); and,
ASTM Test Method D638–61T (tensile strength)

Five specimens were tested directly as a set without having been exposed to water, five others were immersed in boiling water for 2 hours, and five more were kept in boiling water for 72 hours. (Immersion in boiling water for 72 hours is considered to be roughly equivalent to immersion in water at 20° C. for around 3 years with respect to its weakening effect on the strength properties of the laminate. The 72 hour boil is a much more rigorous test than the 2 hour boil. Two hours in boiling water is believed to approximate the effects of a month in water at 20° C. Immersion in boiling water is used as an accelerated method for assessing the permanence of laminates as measured by strength properties. Strength properties, in turn, are dependent upon the degree of bonding, among other factors, between fiberglass and resin. By not varying the other factors, while comparing laminates made with different bonding agents, the effectiveness of each bonding agent relative to the control bonding agent can be rated.) All specimens were wiped dry before strength properties were measured. The data obtained are reported in columns 11A and 11B of Table II.

Another set of control laminates was prepared in which the same coupling agent was applied by vapor phase as opposed to the wet lay-up procedure described above.

The essential ingredients were the same as those in the preceding example, namely fiberglass fabric (heat-cleaned, washed and rinsed as before), Epon 828 epoxy resin, m-phenylenediamine curing agent (CL), and Z–6040 silane coupling agent.

The equipment for vapor-phase application consisted of an insulated chamber which could be heated to about 180° C. Fiberglass cloth was draped over steel racks inside the chamber. Usually 12 pieces of cloth were treated at one time. To accomplish vapor-phase application, about 20 grams of the coupling agent was allowed to drip from a dropping funnel into the otherwise sealed chamber. Each drop struck a heated trough inside as the chamber and its contents were being heated from 105–160° C. Addition of the agent and vaporization was accomplished over a period of approximately 15 minutes. Except for the hole for the dropping funnel, the chamber was sealed off. Vaporization occurred at atmospheric pressure. Upon removal of the treated pre-cut fabric from the vaporization chamber, it was found that the amount of coupling agent deposited on the glass fabric was of the order of 0.01% of the weight of the fabric.

A laminate was made from the fabric treated with the coupling agent by stacking 12.5 by 16 inch rectangles of the fabric and thereafter following the procedure as set forth above, i.e. 14.5 parts of molten m-phenylenediamine was mixed thoroughly with 100 parts of molten Epon 828 and immediately impregnated into 12 plies of fiberglass cloth, the excess fluids were squeezed out, and plies were placed in a laminating press, cured, cooled, cut into 0.5 by 4 inch specimens, and then treated and tested as before. The results are reported in column 9C of Table II.

A series of laminates were prepared utilizing the representative compounds of the present invention and these were compared with the standard laminates prepared as set forth above in Example 9. The preparation of the laminates of the invention is described in Examples 10, 11 and 12 below.

EXAMPLE 10

Preparation of laminate of glass cloth and the epoxy resin using diethyl 1-(allylamino)-2,3-epoxypropylphosphonate as a coupling agent The wet lay-up procedure of Example 9 was followed, except that in place of Z–6040 as the coupling agent, diethyl 1-(allylamino)-2,3-epoxypropylphosphonate was used, and just one laminate (12 plies) was made. Values of concentrations, ratios, heating conditions, sizes, and testing methods were identical with those of Example 9, as were ingredients, except for the composition of the coupling agent. The results obtained are reported in column 10 of Table II.

EXAMPLE 11

Preparation of laminate of glass cloth and epoxy resin using diethyl 1-[3-(triethoxysilyl)propylamino]-2,3-epoxypropylphosphonate as a coupling agent All details of Example 10 were followed except that diethyl 1-[3-(triethoxysilyl)propylamino]-2,3-epoxypropylphosphonate was used as coupling agent in place of diethyl 1-(allylamino) - 2,3 - epoxypropanephosphonate. The results obtained are shown in column 11 of Table II.

EXAMPLE 12

Preparation of glass cloth and epoxy resin using diethyl 1-[3-(triethoxysilyl)propylamino] - 2,3 - epoxypropylphosphonate as a coupling agent All details of the vapor application procedure of Example 9 were followed except that diethyl 1-[3-(triethoxysilyl)propylamino] - 2,3 - epoxypropylphosphonate was used as coupling agent in place of Z–6040. Results are given in column 12 of Table II.

Referring to Table II, it is seen that the results obtained in using the coupling agent of the invention (columns 10, 11, 12 of Table II) compare favorably with those obtained using recognized good quality coupling agents (columns 9A, 9B, 9C of Table II). More particularly, referring to the 12-ply glass reinforced epoxy laminate made using diethyl 1-(allylamino)-2,3-epoxyphosphonate applied from an aqueous system (column 10) and the corresponding control standard (column 9A), it is seen that the amino epoxy phosphonate had greater flexural strength (92,100 p.s.i.) than did the 12-ply laminate made using the recognized standard commercial coupling agent (82,100 p.s.i.). Furthermore, it is remarkable that the flexural strength of 92,100 for the 12-ply laminate made using the amino epoxy phosphonate is almost as much as the corresponding value (95,400) for the 13-ply laminate made using the control coupling agent. Likewise, in relation to tensile strength after the specimens had been immersed in boiling water for 2 hours, the 12-ply laminate made using the amino epoxy phosphonate was superior (59,500 versus 55,700 p.s.i.) to the control laminate reinforced with 13 plies.

In comparing the strengths obtained in using diethyl 1-[3-(triethoxysilyl)-propylamino] - 2,3 - epoxyphosphonate as a coupling agent (column 11 of Table II) with those obtained using the corresponding standard control coupling agent (column 9A of Table II), it is seen that the coupling agent of the invention is substantially superior under all conditions of treatment. For example, flexural strength for the silyl amino epoxy phosphonate exceeded that of the control by a margin of about 10% to 20%. Indeed, the 12-ply laminate prepared according to the invention exceeded the flexural strengths obtained by the 13-ply standard (column 9B of Table II) at all levels of severity of treatment. Furthermore, the compressive and tensile strengths are found, in general, to be superior to the 13-ply laminate of the control (column 9B of Table II).

Similar effects are obtained, when the silyl amine epoxy phosphonate is applied as a vapor. A comparison of the results of column 12 of Table II with those of column 11C show that the silyl amino epoxy phosphonate and the recognized standard coupling agent gave generally similar strength values, both being quite good as compared to the values obtained by aqueous pick-up. The standard coupling agent showed an initial flexural strength advantage for unexposed laminates, but the accelerated wear tests indicate that the silyl epoxy amino phosphonate improves the retention of flexural strength under conditions of severe wear.

It is apparent from the strength tests as a whole that the silyl and epoxy functions of the coupling agent are significantly enhanced by the amino and phosphonate functions contained in the compounds of the invention.

breviated as BPO in subsequent tables). The polyester resin was Paraplex P-43, a trademark of Rohm & Hass Company, a formulated thermosetting liquid having a viscosity of approximately 25 poises, 70% of the composition being the polyester of maleic anhydride, phthalic anhydride and 1,2-propanediol (made using mole proportions of 1.0, 1.0 and 2.2, respectively), the remaining 30% being styrene monomer functioning initially as a diluent. Paraplex P-43 is a recognized and accepted resin for use in fiber glass laminates. Values of properties for the resulting standard laminate are shown in Table III below under column 13A.

A second standard laminate was prepared using the same ingredients as described above with respect to the first standard laminate except that the procedure of application was the vapor method as described above in Example 9. The results obtained for this reference product are tabulated below in column 13B of Table III.

Past practice has been to depend on one kind of coupling agent or finish for fiber glass when laminates are made of epoxy resin, and on another kind of finish when unsaturated polyester is used. For instance, when the thermosetting resin was of the epoxy type, Z-6040 was the type of finish called for, whereas for the polyester type, another type, represented by Z-6030, was required for favorable results. To avoid the inherent problems associated with selected coupling agents for certain thermosetting resins it is desirable to have a universal finish. Such a finish would eliminate the necessity for stocking fiber glass finished in a different way for subsequent use with each kind of laminating resin. That is, fiber glass finished with a single composition (the universal finish) ideally would give laminates of top quality whether the thermosetting resin was of the epoxy type or of the unsaturated polyester type. One material currently promoted as the essential component of such a universal finish is 3-anilinopropyl-trimethoxy-silane; hence it was used in control experiments as set forth hereinbelow in Examples 14 and 15. The objective was to show the comparative effectiveness of using a silyl amino epoxy phosphonate

TABLE II

| Coupling agent [1] | 9A | 9B | 9C | 10 | 11 | 12 |
|---|---|---|---|---|---|---|
| Number of plies, glass cloth | 12 | 13 | 12 | 12 | 12 | 12 |
| Manner coupling agent appln | Aqueous | Aqueous | Vapor | Aqueous | Aqueous | Aqueous |
| Thickness of liminate, in | | 0.125 | 0.125 | 0.118 | 0.117 | 0.119 |
| Content of Epon 828/CL (percent) | 35.1 | 34.4 | 31.3 | 34.6 | 34.8 | 37.6 |
| Flexural strength (p.s.i.): | | | | | | |
| Unexposed to water | [2] 83,100 | 95,400 | 97,900 | 92,100 | 93,400 | 90,400 |
| After 2-hour boil | [2] 80,100 | 87,000 | 85,400 | | 89,500 | 84,900 |
| After 72-hour boil | [2] 67,100 | 76,100 | 71,000 | | 82,000 | 79,500 |
| Compressive strength (p.s.i.): | | | | | | |
| Unexposed to water | | 66,700 | 65,300 | | 60,800 | 64,200 |
| After 2-hour boil | | 55,200 | 59,700 | | 57,400 | 48,900 |
| Tensile strength (p.s.i.): | | | | | | |
| Unexposed to water | | 61,400 | 60,200 | 61,000 | 60,900 | 55,700 |
| After 2-hour boil | | 55,700 | 57,100 | 59,500 | 60,000 | 57,600 |
| After 72-hour boil | | | | 52,200 | 50,800 | 49,800 |

[1] Coupling agent legend:
9A, 9B, 9C: 3-(2,3-epoxypropyloxy)propyl-trimethoxy-silane.
10: Diethyl 1-(allylamino)-2,3-epoxypropylphosphonate.
11, 12: Diethyl 1-[3-(Triethoxysilyl)propylamino]-2,3-epoxypropylphosphonate.
[2] Averages of 3 trials.

EXAMPLE 13

Preparation of standard reference laminate of glass cloth and polyester resin using control coupling agent In order to have a criterion for comparing glass-reinforced polyester laminates in which the one varied factor would be the coupling agent, all other conditions being kept identical in a series of laminates, a first standard laminate was made as follows: The procedure of Example 9 relevant to the 12-ply laminate for an aqueous system was used except that (1) Dow Corning Z-6030 Silane, understood to be methacryloyloxypropyl - tri-methoxy-silane, was used in place of Z-6040 as a control coupling agent, and (2) a 100:1 blend of polyester resin and catalyst was used instead of the 100:4.5 blend of epoxy resin and hardener. The catalyst was benzoyl peroxide (abin universal finish applications as set forth more particularly in Examples 16 and 19.

EXAMPLE 14

Preparation of standard reference laminate of glass cloth and epoxy resin using 3-anilinopropyl-trimethoxy-silane as a representative universal finish The procedure of Example 9 relevant to the 12-ply laminate prepared from an aqueous system was used except that the finish for the fiber glass was 3-anilinopropyl-trimethoxy-silane instead of Z-6040. Values of properties of the resulting laminate made for the purpose of reference are shown in column 14A of Table III.

A second reference specimen was prepared in which the vapor application procedure of Example 9 was used except that 3-anilinopropyl-trimethoxy-silane was used as a finish for the fiber glass instead of Z–6040. The results are tabulated below in column 14B of Table III.

EXAMPLE 15

Preparation of standard reference laminate of glass cloth and epoxy resin using blends of silane coupling agents as a finish applied as vapors The procedure of Example 9 was followed in principle, but instead of Z–6040, a 1:9 blend of 3-anilinopropyl-trimethoxy-silane and Z–6030 was applied as vapor to condense as a combined finish on the surface of the fiber glass. Results are tabulated below in column 15A of Table III.

The previous procedure was repeated, but instead of polyester resin, an epoxy resin as described in Example 9 was used, and instead of using Z–6040 in the blend, Z–6030 was used. The results are given in column 15B of Table III.

EXAMPLE 16

Preparation of a fiber glass -reinforced epoxy-resin laminate, using a binary universal finish containing diethyl 1-[3 - (triethoxysilyl)propylamino] - 2,3-epoxypropyl- A fiber glass fabric was heat-cleaned by keeping it in an oven at 340–370° C. for 72 hours, then washing it with a 0.1% solution of acetic acid in water, and finally rinsing it in water. The aqueous system used in applying one of the superior universal finishes to the cleaned fiberglass was formulated as follows: Water was adjusted to pH 3–4 by means of acetic acid. To 98.4 parts of that solution were added 0.6 part of methacryloyloxypropyl-trimethoxy-silane (Z–6030) and 1.0 part of diethyl 1-[3-triethoxysilyl)propylamino] - 2,3 - epoxypropylphosphonate. The 2 organic silicon compounds were stirred into the aqueous system, which was used to apply the binary finish by padding. The glass cloth, saturated with the solution, was squeezed between the rolls of the 2-roll padder. The finish was cured on the fibrous glass by heating the cloth for 1.5 minutes at approximately 120° C. The resulting glass cloth had a fairly soft hand.

That treated glass cloth was used to make a 12-ply laminate with a 100:14.5 blend of Epon 828 and m-phenylenediamine. Pressing conditions and testing methods were as described in Example 9. Values showing the excellent strength characteristics of that laminate are given in column 16 of Table III.

EXAMPLE 17

Preparation of a fiber glass-reinforced epoxy-resin laminate using a 3-component universal finish containing diethyl 1-[3-(triethoxysilyl)propylamino] - 2,3 - epoxypropylphosphonate A fiber glass fabric was heat-cleaned by keeping it in an oven at 340–370° C. for 72 hours, then washing it with a 0.1% solution of acetic acid in water, and finally rinsing it in water. The aqueous system used in applying the 3-component universal finish of this example was formulated as follows: Water was adjusted to pH 3–4 by means of acetic acid. To 96.4 parts of that solution were added 0.6 part of methacryloyloxypropyl-trimethoxy-silane (Z–6030), 1.0 part of diethyl 1-[3-(triethoxysilyl) propylamino]-2,3-epoxypropylphosphonate, and 2.0 parts of Volan L. (Volan L is the trademark of E. I. du Pont de Nemours & Co. (Inc.) for methacrylato chromium chloride complex, a standardized finishing chemical for fiber glass which gives the fabric a characteristic green tint regarded as being desirable by some users.) The aqueous system was well mixed and applied as a ternary finish by padding. After drying and curing at approximately 120° C. for 1.5 minutes, the fabric was washed with water and re-dried.

The glass cloth so treated was used to make a 12-ply laminate with 100:14.5 mixture of Epon 828 and m-phenylenediamine. Pressing conditions and testing methods were as described in Example 9. Results are given in column 17 of Table III.

EXAMPLE 18

Preparation of fiber glass-polyester laminate using a binary universal finish containing diethyl 1-(3-triethoxysilyl)propylamino]-2,3-epoxypropylphosphonate The procedure duplicated that of Example 16 except that a 100:1 blend of Paraplex P–43 and benzoyl peroxide was used instead of the 100:14.5 blend of Epon 828 and m-phenylenediamine. Superior strength properties were shown by the laminate, as tabulated below in column 18 of Table III.

EXAMPLE 19

Preparation of a fiber glass-polyester laminate using a 3-component universal finish containing diethyl 1-[3-triethoxysilyl)propylamino] - 2,3-epoxypropylaminophosphonate The procedure of Example 17 was used except that a 100:1 blend of Paraplex P–43 and benzoyl peroxide replaced the 100:14.5 blend of Epon 828 and m-phenylenediamine. The results are given in column 19 of Table III.

The results of Examples 14 and 15, in comparison, can be summarzied by saying that 3-anilinopropyl-trimethoxysilane, with or without Z-6030, and whether applied from aqueous system or as vapor, is roughly equivalent to Z–6040 for epoxy-type laminate. Furthermore, the same type of general conclusion, this time with respect to polyester-type laminates, is in order after comparing strength data of column 15B (Table III) with data of column 13B (Table III). That is, while there might have been some gain achieved by combining 3-anilinopropyl-trimethoxysilane with Z-6030 applied as vapor and used with a polyester laminating resin, the gain was not consistent. Nevertheless, it is apparent that both epoxy and polyester types of laminates were fairly satisfactory when using 3-anilinopropyl-trimethoxy-silane, and to that extent it is a useful reference finish in judging the merits of finishes compounded with a silyl amino epoxy phosphonate.

It is readily shown that the finishes predominating in silyl amino epoxy phosphonates compare very favorably with standard and accepted finishes, whether universal or not, and whether or not the laminate contains epoxy or polyester resin. A comparison of the data of Example 18 with that of Example 13 (as set forth in column 13A of Table III) shows the generally excellent strength characteristics that are obtained in adding a proportion of a silyl amino epoxy phosphonate to the coupling agent solution.

The same advantage or improvement is seen in a comparison of the standard universal finishes (columns 14A, 14B, 15A, 15B of Table III) with those finishes including a silyl amino epoxy phosphonate of the invention (columns 16–19).

With attention directed at binary finish compositions in which a blend of a silyl amino epoxy phosphonate and a silane of the activated vinyl type in the ratio of 1.0:0.6 had been applied from an aqueous system (Examples 16 and 18), it is seen that flexural strength values exceeded those of reference laminates (Examples 14 and 15) or of standard specimens made using control coupling agents (Example 13). It is to be emphasized that such was the result for both epoxy and polyester types of fiber glass reinforced laminates. Hence not only was the finish composition containing the silyl amino epoxy phosphonate a universal finish insofar as applying to thermosetting resins generally, it was an improved finish for both epoxy and polyester types of glass fiber-reinforced laminates. Table III shows that the improvement carried through the accelerated water-exposure tests as well, including the several 72-hour boiling water test. Furthermore, the data for compressive strength and tensile strength were good. Even with the chromium compound present (the 3-component finish of Examples 17 and 19), the silyl amino epoxy phosphonate helped to impart strength to the laminates. Laminates which contained the chromium compound were affected by severe exposure to water, but even they rated well for the 2-hour boiling water test.

Unusually high strength values were derived from the binary finish formulation based on a silyl amino epoxy phosphonate when used in laminates of the thermosetting unsaturated polyester type, as especially indicated by the flexural strengths of 115,500 and 104,900 p.s.i. (before and after the 2-hour boil, respectively), compressive strengths of 77,400 and 66,200 p.s.i., and tensile strengths of 65,600 and 62,600 p.s.i. (all from Example 18). The strengths are all the more remarkable in that the silyl amino epoxy phosphonate was not unsaturated. Past experience has lead to associating successful finishes for polyester laminating resins with compounds having active vinyl groups. For example, both Z–6030 and Volan L are derivatives of methacrylic acid, which possesses a very active vinyl group for interpolymerization with maleic unsaturation and vinyl unsaturation in the polyester and styrene components, respectively, of Paraplex P–43, Consequently, a silyl amino epoxy phosphonate can be used to provide a superior universal finish for fiber glass used to reinforce thermosetting resins.

TABLE III

| Example number | Standard coupling agent in polyester laminates | | Laminates with standard universal finish | | | | Laminates with silyl amino epoxy phosphonates in a universal finish | | | |
| --- | --- | --- | --- | --- | --- | --- | --- | --- | --- | --- |
| | 13A | 13B | 14A | 14B | 15A | 15B | 16 | 17 | 18 | 19 |
| Application method | Aqueous | Vapor | Aqueous | Vapor | Vapor | Vapor | Aqueous | Aqueous | Aqueous | Aqueous |
| Number of plies | 12 | 12 | 12 | 12 | 12 | 12 | 12 | 12 | 12 | 12 |
| Thickness of laminate, in | 0.120 | 0.120 | 0.117 | 0.116 | 0.127 | 0.120 | 0.115 | 0.115 | 0.102 | 0.117 |
| Resin content (inc. curing agent) (percent): | | | | | | | | | | |
| Epon 828/CL (epoxy) | | | 35.3 | 35.0 | 38.8 | | 34.8 | 34.6 | | |
| Paraplex P–43/PBO (polyester) | 36.9 | 36.0 | | | | 36.3 | | | 30.4 | 35.8 |
| Flexural strength (p.s.i.): | | | | | | | | | | |
| Before exposure | 88,600 | 96,300 | 92,300 | 92,200 | 93,200 | 102,200 | 103,500 | 102,500 | 115,500 | 100,200 |
| After 2-hour boil | 82,400 | 89,800 | 78,900 | 91,100 | 86,600 | 90,700 | 96,100 | 94,400 | 104,900 | 79,700 |
| After 72-hour boil | 63,100 | 65,400 | 60,900 | 82,100 | 76,000 | 62,700 | 84,700 | 70,900 | 79,300 | 32,400 |
| Compressive strength (p.s.i.): | | | | | | | | | | |
| Before exposure | 63,500 | | 69,800 | 72,500 | 62,200 | 69,800 | 74,200 | 62,500 | 77,400 | 66,900 |
| After 2-hour boil | 45,100 | | | 63,500 | 57,900 | 58,400 | 64,600 | 57,500 | 66,200 | 59,400 |
| After 72-hour boil | | | 65,300 | | 56,000 | 35,200 | 59,000 | 46,300 | 33,000 | 20,900 |
| Tensile strength (p.s.i.): | | | | | | | | | | |
| Before exposure | 54,000 | | 60,200 | 57,900 | 59,400 | 61,600 | 65,200 | 65,400 | 65,600 | 59,800 |
| After 2-hour boil | 53,000 | | 49,800 | 55,800 | 57,700 | 56,200 | 63,100 | 60,500 | 62,600 | 60,000 |
| After 72-hour boil | 43,400 | | 44,100 | 50,000 | 50,700 | 41,700 | 50,800 | 41,500 | 54,800 | 43,000 |

What I claim is:

1. A method of modifying an active hydrogen containing polymer selected from the group consisting of polysaccharides and derivatives thereof, proteins and derivatives thereof and synthetic polymers having hydroxyl or amino groups which comprises contacting said polymer with an amino epoxy phosphonate having the formula

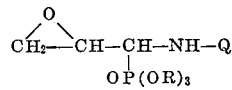

wherein R is selected from the group consisting of alkyl of 1 to 18 carbon atoms, ethoxyethyl, benzyl, cyclohexyl, allyl, methallyl and phenyl and Q is selected from the group consisting of hydrogen, alkyl of 1–18 carbons, ethoxyethyl, benzyl, allyl, phenyl; a grouping

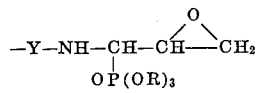

where, in said grouping,

Y is a divalent organic radical which is selected from the group consisting of alkylene of 2–6 carbon atoms and phenylene; and a grouping —R'''Si(R'')₃ wherein

R'' is selected from the group consisting of methoxy, ethoxy, methyl, allyl, and phenyl; and R''' is an alkylene radical of 1 to 5 carbon atoms and effecting reaction under conditions of acid catalysis.

2. The process of claim 1 wherein said active-hydrogen containing polymer is a cellulosic fabric.

3. The process of claim 1 wherein said amino epoxy phosphonate compound is selected so as to cross-link said active-hydrogen containing polymer.

4. The process of claim 1 wherein said amino epoxy phosphonate has two epoxy functions and the cross-linking is through the reaction of both epoxy functions with said polymer containing active hydrogen.

5. The process of claim 1 wherein said amino epoxy phosphonate is selected such that substituent R has an alkenyl group, and said cross-linking is at least in part through polymerization reaction of said alkenyl group.

6. The method of treating a cellulosic fabric with an amino epoxy phosphonate compound, comprising the steps of impregnating said fabric with a solution containing an amino epoxy phosphonate having the formula

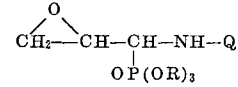

wherein R is selected from the group consisting of alkyl of 1 to 18 carbon atoms, ethoxyethyl, benzyl, cyclohexyl, allyl, methallyl and phenyl and Q is selected from the group consisting of hydrogen, alkyl of 1–18 carbons, ethoxyethyl, benzyl, allyl, phenyl; a grouping

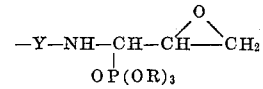

where, in said grouping,

Y is a divalent organic radical which is selected from the group consisting of alkylene of 2–6 carbon atoms and phenylene; and a grouping —R'''Si(R'')₃ wherein

R'' is selected from the group consisting of methoxy, ethoxy, methyl, allyl, and phenyl; and R''' is an alkylene radical of 1 to 5 carbon atoms drying said impregnated fabric, thereafter impregnating said fabric with a solution of an acid or acid-yielding catalyst, then drying and heating the treated fabric for a time and temperature sufficient to effect a cure, and then neutralizing, washing and drying said fabric.

7. The method according to claim 6 wherein said catalyst is selected from the group consisting of zinc tetrafluoroborate, inorganic acid salts of polyvalent metals, and non-volatile organic acids.

8. The method according to claim 6 wherein said catalyst is zinc tetrafluoroborate, and is used in the amount of 0.01 to 0.1 of the amount of amino epoxy phosphonate.

9. The product produced by the process of claim 2.
10. The product produced by the process of claim 4.
11. The product produced by the process of claim 5.
12. The product produced by the process of claim 1.
13. The product produced by the process of claim 3.

References Cited

UNITED STATES PATENTS 3,528,998   9/1970   Tesoro _____ 8—116.2 X

GEORGE F. LESMES, Primary Examiner

J. CANNON, Assistant Examiner

U.S. Cl. X.R.

8—116 P, 120, 127.6, 128, DIG. 4, DIG. 10; 106—15 FP, 124, 162, 167, 168, 169, 177, 186, 197, 210, 264; 117—126 GE, 126 GS, 126 GN, 136, 161 VA, 161 VZ, 161 ZA, 161 ZB, 161 K; 161—46, 184, 185; 260—6, 9, 17, 17 A, 17.4, 87.3, 89.3, 91.3 VA, 112, 231, 231 A, 233.3, 824 EP, 830, 836, DIG. 24